United States Patent
Reimer

(10) Patent No.: US 6,372,147 B1
(45) Date of Patent: Apr. 16, 2002

(54) ORGANOBORON WASTE STREAM TREATMENT USING HYDROGEN PEROXIDE

(75) Inventor: Ronald A. Reimer, Orange, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/850,549

(22) Filed: May 7, 2001

(51) Int. Cl.$^7$ .................................................. C02F 1/72

(52) U.S. Cl. ........................ 210/759; 210/761; 210/762; 210/763; 210/908

(58) Field of Search ................................. 210/759, 761, 210/762, 763, 908; 423/276

(56) References Cited

U.S. PATENT DOCUMENTS

| 4,046,815 | A |   | 9/1977 | Nazarenko |
| 4,076,756 | A |   | 2/1978 | Nazarenki et al. |
| 4,246,104 | A | * | 1/1981 | Schmidt et al. |
| 4,285,820 | A | * | 8/1981 | Akune |
| 4,840,765 | A |   | 6/1989 | Doherty et al. |
| 5,709,841 | A |   | 1/1998 | Reimer |

\* cited by examiner

*Primary Examiner*—David A. Simmons
*Assistant Examiner*—Betsey Morrison Hoey
(74) *Attorney, Agent, or Firm*—Gerald E. Deitch

(57) ABSTRACT

A process for the treatment of aqueous waste streams having a pH of 5 to 11 and containing organoboron compounds of the formula $R_4B^{-1}M^+$ with hydrogen peroxide in order to convert such organoboron compounds to boric acid and organic compounds.

5 Claims, No Drawings

ORGANOBORON WASTE STREAM TREATMENT USING HYDROGEN PEROXIDE

BACKGROUND OF THE INVENTION

1. Field of the Invention

The present invention relates to the treatment of aqueous waste streams containing organoboron compounds in order to convert the organoboron compounds to boric acid and organic compounds. In particular, this invention relates to the hydrolysis of phenylated boron compounds to boric acid and benzene.

2. Description of Related Art

Organoboron compounds, such as triphenylborane, are suitable for use as promoters in the hydrocyanation of butadiene. Arylboron compounds used in hydrocyanation reactions can be prepared by the process described in U.S. Pat. No. 4,046,815 and 4,076,756. The preparation of such compounds can produce an aqueous waste stream that contains various amounts of organoboron compounds. For environmental reasons, it is desirable to reduce the level of organoboron compounds in such streams.

U.S. Pat. No. 5,709,841 discloses a process in which aqueous waste streams containing organoboron compounds of the formula $R_3B$, $R_4B^{-1}$, and $R_2BOH$ are treated to hydrolyze the compounds to boric acid and the corresponding hydrocarbons. The process involves treatment of the waste streams to adjust the pH of the stream to a value between 5 and 9 and elevating the temperature to at least 150° C., at a pressure sufficiently high to prevent substantial evaporation of the aqueous solution. This process may not be sufficient for complete $R_4B^{-1}$ hydrolysis within a reasonable period of time.

U.S. Pat. No. 4,840,765 discloses a process for acid hydrolysis of 4PBS (sodium tetraphenylborate) contained in nuclear waste. The hydrolysis is performed in the presence of a copper(II) cation catalyst and formic acid.

BRIEF SUMMARY OF THE INVENTION

The present invention is a process for treating an aqueous waste steam containing an organoboron compound of the formula $R_4B^{-1}M^+$, comprising adjusting the pH of said stream to a value between 5 and 11, and contacting said stream with hydrogen peroxide at a temperature of at least 150° C.; wherein: R is selected from the group consisting of phenyl, ortho-tolyl, para-tolyl, naphthyl, para-methoxyphenyl, para-aminophenyl and biphenyl, and wherein R is optionally substituted with Br or Cl, and $M^+$ is selected from the group consisting of $Na^+$, $K^+$, $NH_4^+$, $Li^+$, $H^+$, and $Cs^+$.

DETAILED DESCRIPTION OF THE INVENTION

Aqueous waste streams containing $R_4B^{-1}M^+$ may result from preparing triphenylboron by the method described in U.S. Pat. No. 4,046,815. Organoboron compounds of the formula $R_3B$, $R_2BOH$, and $RB(OH)_2$ also are typical components of such waste streams. The $R_4B^{-1}$ compound requires a counter ion, $M^+$. Typically $M^+$ is $Na^+$. The organic groups (R) of $R_4B^{-1}M^+$ can be the same or different. R can be aryl or substituted aryl having 6 to 12 carbon atoms. Examples of such R groups are phenyl, orthotolyl, paratolyl, naphthyl, para-methoxyphenyl, para-aminophenyl, biphenyl, chlorophenyl, and bromophenyl. Such waste streams will usually contain, in addition to the organoboron compound(s), (1) alkali metal halides, (2) lower alkyl alcohols (ie, those with 1 to 6 carbon atoms), and (3) boric acid.

The aforementioned waste streams containing the organoboron compounds can be treated to hydrolyze the organoboron compounds to boric acid and an organic compound, and then subjected to a distillation to remove the resulting organic compound (benzene, for example, in the case of phenylated boron compounds). The resulting product is then amenable to biotreatment. It is important that substantially all of the organoboron content is hydrolyzed prior to biotreatment. Compounds of the formula $R_4B^{-1}M^+$ (sodium tetraphenylborate, for example) are particularly difficult to hydrolyze. Sodium tetraphenylborate can inhibit wastewater biotreatment systems.

The addition of hydrogen peroxide to the hydrolysis reaction increases the extent of hydrolysis of the $R_4B^{-1}$ compounds. This makes the hydrolysis product more amenable to bio-processing.

Hydrogen peroxide is preferred over other oxygen sources because of its high solubility which allows 200 ppm or greater levels to be used in the process. Preferably, the concentration of hydrogen peroxide is at least 200 ppm. More preferably, the concentration is greater than 2000 ppm.

The hydrolysis reaction can be performed at a pH of 5 to 11. The temperature should be at least 150° C. Preferably, the temperature is 200 to 250° C. The preferred pressure of the hydrolysis is 150 to 4000 psig (1.14 to 27.7 MPa). Preferably, the pressure is chosen to minmize vaporization of the aqueous solution.

Optionally, a metal catalyst may be used to promote the hydrolysis of $R_4B^{-1}$ compounds. However, due to potential bio-toxicity issues, it is preferred that no such catalyst be used.

The present process is amenable to the aforementioned $R_4B^{-1}M^+$ compounds in which $M^+$ is $K^+$, $NH4^+$, $Li^+$, $H^+$, and $Cs^+$. It is also applicable to organoboron compounds in which the R groups are substituted with Br or Cl.

EXAMPLES

Examples 1 to 3 were carried out in 10 ml, 316 stainless steel, mini-bomb reactors heated by a 200° C. sand bath. Ten reactors, charged with 6 ml each of identical 4PBS (sodium tetraphenylborate) solutions, were simultaneously placed in the 200° C. bath and then removed intermittently at predetermined times. In all runs, solution pH was maintained at about 9.3 using a buffer solution made by mixing 882 ml of 0.1N NaOH solution with 9.27g $H_3BO_3$, and diluting to 1000 ml total volume with de-ionized water.

Example 1

A solution containing 2000 ppm sodium tetraphenylborate (4PBS) in pH 9.3 buffer solution declined to about 600 ppm 4PBS after 120 minutes holdup time. For comparison, this experiment was repeated, except that 200 ppm $H_2O_2$ was present. In this latter case, the final 4PBS concentration was about 3 ppm.

Example 2

A solution containing 2000 ppm 4PBS in pH 9.3 buffer solution (with 1 mL second phase benzene added) declined to about 700 ppm 4PBS after 120 minutes. For comparison, this experiment was repeated, except that 200 ppm $H_2O_2$ was present. In this latter case, the final 4PBS concentration was about 60 ppm.

Example 3

A solution containing 2000 ppm 4PBS in pH 9.3 buffer solution with 1 ml of second phase organics containing about 90% benzene plus cyclohexane, about 6–12% isopropanol, and about 1 other organics such as phenylisopropanol, phenol, and biphenyl, declined to about 1300 ppm 4PBS after 140 minutes. For comparison this experiment was repeated except that 200 ppm $H_2O_2$ was present. In this latter case, the final 4PBS concentration was about 10 ppm.

What is claimed is:

1. A process for treating an aqueous waste steam containing an organoboron compound of the formula $R_4B^{-1}M^+$, comprising adjusting the pH of said stream to a value between 5 and 11, and contacting said stream with hydrogen peroxide at a temperature of at least 150° C.; wherein:

R is selected from the group consisting of phenyl, ortho-tolyl, para-tolyl, naphthyl, para-methoxyphenyl, para-aminophenyl and biphenyl, and wherein R is optionally substituted with Br or Cl, and $M^+$ is selected from the group consisting of $Na^+$, $K^+$, $NH4^+$, $Li^+$, $H^+$, and $Cs^+$.

2. The process of claim 1 wherein the concentration of hydrogen peroxide is at least 200 ppm.

3. The process of claim 2 wherein the temperature is 200 to 250° C.

4. The process of claim 3 wherein $R_4B^{-1}$ $M^+$ is sodium tetraphenylborate.

5. The process of claim 4 wherein the concentration of hydrogen peroxide is at least 2000 ppm.

* * * * *